(12) United States Patent
Wang (10) Patent No.: US 11,825,411 B2
(45) Date of Patent: *Nov. 21, 2023

(54) NETWORK DEVICE, METHOD AND COMPUTER READABLE MEDIUM FOR WIRELESS NETWORKS

(71) Applicant: ARRIS Enterprises LLC, Suwanee, GA (US)

(72) Inventor: Liang Wang, Shenzhen (CN)

(73) Assignee: ARRIS ENTERPRISES LLC, Suwanee, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/093,935

(22) Filed: Jan. 6, 2023

(65) Prior Publication Data

US 2023/0164689 A1 May 25, 2023

Related U.S. Application Data

(63) Continuation of application No. 17/469,014, filed on Sep. 8, 2021, now Pat. No. 11,558,815.

(51) Int. Cl.
*H04W 52/02* (2009.01)

(52) U.S. Cl.
CPC ............... *H04W 52/0206* (2013.01)

(58) Field of Classification Search
CPC .................................. H04W 52/0206
USPC ........................................ 370/311
See application file for complete search history.

(56) References Cited

U.S. PATENT DOCUMENTS

| | | |
|---|---|---|
| 2013/0235726 A1 | 9/2013 | Frederiksen et al. |
| 2014/0022973 A1 | 1/2014 | Kopikare |
| 2015/0319688 A1 | 11/2015 | Matas Sanz et al. |
| 2016/0366638 A1 | 12/2016 | Kumar |

FOREIGN PATENT DOCUMENTS

| | | |
|---|---|---|
| EP | 2 432 270 | 3/2012 |
| EP | 3 010 289 | 4/2016 |

OTHER PUBLICATIONS

International Search Report and Written Opinion of the International Searching Authority dated Dec. 9, 2021, in International (PCT) Application No. PCT/US2021/049382.
International Preliminary Report on Patentability and Written Opinion dated Mar. 23, 2023 in International Application No. PCT/US2021/049382.

*Primary Examiner* — Gbemileke J Onamuti
(74) *Attorney, Agent, or Firm* — Wenderoth, Lind & Ponack, L.L.P.

(57) ABSTRACT

Network devices include a memory and a processor, wherein the processor is configured to determine a connection state of one or more first client devices, and in response to the determination that none of the one or more first client devices are connected to the wireless network for a predetermined time period, cause one or more second client devices currently connected to network devices other than a predetermined network device in the wireless network to connect to the predetermined network device. The network devices other than the predetermined network device turn off their wireless access function such that the wireless access function of only the predetermined network device is kept on.

20 Claims, 5 Drawing Sheets

NETWORK DEVICE, METHOD AND COMPUTER READABLE MEDIUM FOR WIRELESS NETWORKS

This application is a continuation of U.S. application Ser. No. 17/469,014, filed Sep. 8, 2021.

TECHNICAL FIELD

The present disclosure relates to wireless networks, and more particularly, to network devices, methods, computer-readable media, and apparatuses for saving power consumption in wireless networks.

BACKGROUND ART

Wireless networks have been widely used in various offices or living environments. In various environments such as home/office, due to various factors such as a large area to be covered, a large number of client devices, or a dense distribution of client devices, if only one network device (for example, an access point, AP) or other network devices with access function) provides wireless access (for example, Wi-Fi access) in the area, the wireless access it provides may not fully cover the entire area, or it may not provide reliable wireless access to meet user needs for all client devices in the environment.

Therefore, in this kind of environment, the range of wireless network can be expanded by adding one or more network devices, e.g., a wireless mesh network can be formed by adding one or more extended APs (aka, extenders or extender APs), so that Wi-Fi can have a wider coverage, larger capacity and higher transmission reliability, thus improving the user's experience of accessing wireless network.

However, compared with a wireless network composed of only one main AP, a wireless network architecture composed of a plurality of network devices (for example, a plurality of APs, or a main AP and an extended AP) will consume more power.

SUMMARY OF THE INVENTION

The present disclosure relates to power saving in a wireless network including a plurality of network devices.

Some aspects of the present disclosure relate to a first network device for a wireless network, wherein the wireless network comprises a plurality of network devices having a wireless access function, the plurality of network devices comprise the first network device, the first network device comprising a memory having instructions stored thereon and a processor configured to execute the instructions stored on the memory to cause the first network device to perform the following operations: determining a connection state of one or more first client devices; and in response to the determination that none of the one or more first client devices are connected to the wireless network for a predetermined time period, causing one or more second client devices currently connected to network devices other than a predetermined network device among the plurality of network devices in the wireless network to connect to the predetermined network device; and instructing the network devices other than the predetermined network device to turn off the wireless access function such that the wireless access function of only the predetermined network device is kept on.

In some embodiments, for the above-mentioned first network devices, wherein the first network device is connected with other network devices among the plurality of network devices by wire, the processor is further configured to execute instructions stored on the memory to cause the first network device to perform the following operations: determining whether any of the one or more first client devices is connected to the predetermined network device; and in response to the determination that at least one of the one or more first client device is connected to the predetermined network device, instructing the network devices other than the predetermined network device to turn on the wireless access function.

In some embodiments, for the above-mentioned first network devices, wherein in a case where the predetermined network device comprises the first network device, the processor is further configured to execute instructions stored on the memory to cause the first network device to perform the following operations: in response to the determination that the at least one of the one or more first client devices is connected to the predetermined network device, notifying the network devices other than the predetermined network device to turn on the wireless access function through a wired connection.

In some embodiments, for the above-mentioned first network device, wherein in a case where the predetermined network device does not comprise the first network device, the processor is further configured to execute instructions stored on the memory to cause the first network device to perform the following operations: receiving a message from the predetermined network device through a wired connection, wherein the message indicates that the at least one of the one or more first client devices has been connected to the predetermined network device; turning on the wireless access function on the first network device; and notifying network devices other than the predetermined network device and the first network device to turn on the wireless access function through a wired connection.

In some embodiments, for the above-mentioned first network device, wherein the processor is further configured to execute instructions stored on the memory to cause the first network device to perform the following operations: periodically polling network devices other than the first network device among the plurality of network devices to determine the connection state of the one or more first client devices; or periodically receiving reports from the network devices other than the first network device among the plurality of network devices to determine the connection state of the one or more first client devices.

In some embodiments, for the above-mentioned first network device, wherein the processor is further configured to execute instructions stored on the memory to cause the first network device to: cause the one or more second client devices to connect to the predetermined network device through signaling based on wireless network protocol; or cause the one or more second client devices to connect to the predetermined network device by temporarily adding the one or more second client devices to blacklists of the network devices other than the predetermined network device.

In some embodiments, for the above-mentioned first network devices, wherein the one or more first client devices and the predetermined network device are set by a user through a configuration page or a graphical user interface of an application of the wireless network.

Other aspects of the present disclosure relate to a method for a wireless network, wherein the wireless network comprises a plurality of network devices having a wireless access function, and the plurality of network devices comprise a first network device, and the method comprising: determining a connection state of one or more first client devices; and in response to the determination that none of the one or more first client devices are connected to the wireless network for a predetermined time period, causing one or more second client devices currently connected to network devices other than the predetermined network device among the plurality of network devices in the wireless network to connect to the predetermined network device; and instructing the network devices other than the predetermined network device to turn off the wireless access function, such that the wireless access function of only the predetermined network device is kept on; wherein the method is executed by the first network device.

In some embodiments, for the above method, wherein the first network device is connected with other network devices among the plurality network devices by wire, and the method further comprising: determining whether any of the one or more first client devices is connected to the predetermined network device; and in response to the determination that at least one of the one or more first client devices is connected to the predetermined network device, instructing the network devices other than the predetermined network device to turn on the wireless access function.

In some embodiments, for the above method, wherein in a case where the predetermined network device comprises the first network device, the step of in response to the determination that the at least one of the one or more first client devices is connected to the predetermined network device, instructing the network devices other than the predetermined network device to turn on the wireless access function further comprising: in response to the determination that the at least one of the one or more first client devices is connected to the predetermined network device, notifying the network devices other than the predetermined network device to turn on the wireless access function through a wired connection.

In some embodiments, for the above method, wherein in a case where the predetermined network device does not comprise the first network device, the step of in response to the determination that the at least one of the one or more first client devices is connected to the predetermined network device, instructing the network devices other than the predetermined network device to turn on the wireless access function further comprising: receiving a message from the predetermined network device through a wired connection, wherein the message indicates that the at least one of the one or more first client devices has been connected to the predetermined network device; turning one the wireless access function on the first network device; and notifying network devices other than the predetermined network device and the first network device to turn on the wireless access function through a wired connection.

In some embodiments, for the above method, wherein the step of causing the one or more second client devices to connect to the predetermined network device further comprises: causing the one or more second client devices to connect to the predetermined network device through signaling based on wireless network protocol; or causing the one or more second client devices to connect to the predetermined network device by temporarily adding the one or more second client devices to blacklists of the network devices other than the predetermined network device.

In some embodiments, for the above method, wherein the one or more first client devices and the predetermined network device are set by a user through a configuration page or a graphical user interface of an application of the wireless network.

Other aspects of the present disclosure relate to a non-transient computer-readable medium for a wireless network, wherein the wireless network comprises a plurality of network devices having a wireless access function, the plurality of network devices comprise a first network device, the non-transient computer-readable medium having instructions stored thereon, that when executed by a processor of the first network device, cause the first network device to perform the following operations: determining a connection state of one or more first client devices; and in response to the determination that none of the one or more first client devices are connected to the wireless network for a predetermined time period, causing one or more second client devices currently connected to network devices other than the predetermined network device among the plurality of network devices in the wireless network to connect to the predetermined network device; and instructing the network devices other than the predetermined network device to turn off the wireless access function, such that the wireless access function of only the predetermined network device is kept on.

In some embodiments, for the above-mentioned non-transient computer-readable medium, wherein the first network device is connected with other network devices among the plurality of network devices by wire, the non-transient computer-readable medium further comprising instructions that, when executed by the processor of the first network device, cause the first network device to perform the following operations: determining whether any of the one or more first client devices is connected to the predetermined network device; and in response to the determination that at least one of the one or more first client devices is connected to the predetermined network device, instructing the network devices other than the predetermined network device to turn on the wireless access function.

In some embodiments, for the above-mentioned non-transient computer-readable medium, wherein in a case where the predetermined network device comprises the first network device, the non-transient computer-readable medium further comprising instructions that, when executed by the processor of the first network device, cause the first network device to perform the following operations: in response to the determination that the at least one of the one or more first client devices is connected to the predetermined network device, notifying the network devices other than the predetermined network device to turn on the wireless access function through a wired connection.

In some embodiments, for the above non-transient computer-readable medium, wherein in a case where the predetermined network device does not comprise the first network device, the non-transient computer-readable medium further comprising instructions that, when executed by the processor of the first network device, cause the first network device to perform the following operations: receiving a message from the predetermined network device through a wired connection, wherein the message indicates that the at least one of the one or more first client devices has been connected to the predetermined network device; turning on the wireless access function on the first network device; and notifying network devices other than the predetermined network device and the first network device to turn on the wireless access function through a wired connection.

In some embodiments, the above-mentioned non-transient computer-readable medium further comprising instructions that, when executed by the processor of the first network device, cause the first network device to: cause the one or more second client devices to connect to the predetermined network device through signaling based on wireless network protocol; or cause the one or more second client devices to connect to the predetermined network device by temporarily adding the one or more second client devices to blacklists of the network devices other than the predetermined network device.

In some embodiments, for the above non-transient computer-readable medium, wherein the one or more first client devices and the predetermined network device are set by a user through a configuration page or a graphical user interface of an application of the wireless network.

Other aspects of the present disclosure relate to an apparatus for a wireless network, which comprises means for performing operations of the method as described above.

DESCRIPTION OF THE ATTACHED DRAWINGS

In order to better understand the present disclosure and show how to implement, description will now be made by way of examples with reference to the accompanying drawings, noting that similar reference numerals refer to the corresponding parts throughout the drawings.

DETAILED DESCRIPTION

The following detailed description is made with reference to the attached drawings, and the following detailed description is provided to facilitate comprehensive understanding of various exemplary embodiments of the present disclosure. The following description comprises various details to facilitate understanding. However, these details are merely considered as examples, not for limiting the present disclosure. The present disclosure is defined by the appended claims and their equivalents. The words and phrases used in the following description are only used to enable a clear and consistent understanding of the present disclosure. In addition, for clarity and brevity, descriptions of well-known structures, functions, and configurations may be omitted. Those of ordinary skilled in the art will realize that various changes and modifications can be made to the examples described in the present specification without departing from the gist and scope of the present disclosure.

As mentioned above, in the prior art, in scenes such as the home or the office, a plurality of network devices may be used to provide a wireless network with wide coverage, large capacity and high reliability. However, this network architecture will also consume more power, especially by the wireless access function. If the wireless access function on a plurality of network devices in such wireless network is always kept open, the power consumption would be high.

Therefore, this disclosure seeks to turn off the wireless access function on one or more unnecessary network devices under certain circumstances (for example, when family members/office workers leave home/office, the number of client devices using wireless access decreases or some areas in home/office no longer need comprehensive coverage), thereby saving power consumption.

Figure 1:
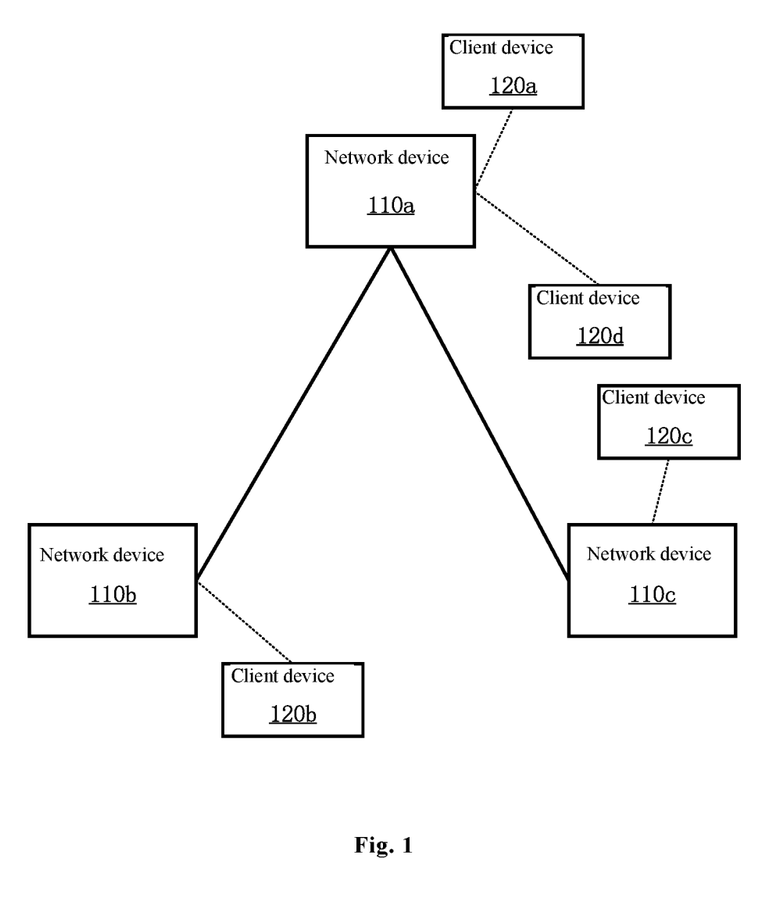
FIG. 1 is a schematic diagram showing an example network environment according to an embodiment of the present disclosure.

FIG. 1 is a schematic diagram showing an example network environment 100 according to an embodiment of the present disclosure.

In some embodiments, the example network environment 100 may comprise a plurality of network devices 110a, 110b, 110c (hereinafter collectively referred to as network device 110 for simplicity) and one or more client devices 120a, 120b, 120c, 120d (hereinafter collectively referred to as client device 120 for simplicity). In some embodiments, the network device 110 may receive various types of messages from and/or send various types of messages to the client device 120. For example, one or more client devices 120 may access a wireless network through the corresponding network device 110 and receive one or more data services, one or more audio/video services, one or more home security services and/or other services through the corresponding network device 110. In some embodiments, some or all of the network devices of the network devices 110 can be connected with each other by wire to receive/transmit various types of messages.

The network devices 110 may be various types of network devices with wireless access function and capable of transmitting messages between the client devices 120 and the network, such as an access point (AP) with wireless access function, a transceiver, a controller, a radio node, a router (e.g., a wireless router and mobile hotspot router), a gateway, and a home network controller. In some embodiments, the network device 110a may be referred to herein as a first network device. For example, the network device 110a may be the main AP in the wireless network, and the network devices 110b, 110c may be the extended APs in the wireless network. In such examples, the first network device 110a and the network devices 110b and 110c can be connected by wire. The first network device 110a can acquire the information stored in the extended network devices (e.g., the network devices 110b and 110c), and can centrally control and manage the extended network devices. In other embodiments, all network devices can be connected with each other by wire, and one of the extended network devices can also obtain information from other network devices and notify and control other network devices. Note that the present disclosure does not specifically limit the type of the network device 110. It should be noted that, for the sake of simplicity, when AP is mentioned in the following, it is intended to comprise various network devices with AP functions.

In some embodiments, the client devices 120 may comprise various types of devices, including but not limited to smart phones, cellular phones, smart watches, wearable devices, consumer electronic devices, portable computing devices, desktop computers, laptop computers, sub-notebooks/netbooks, servers, computers, mainframe computers, cloud-based computers, tablet computers and other electronic devices, or smart audio devices, webcams, lighting equipment, smart refrigerators, smart air conditioners, or any other type of smart home or smart office equipment that can send and/or receive messages in a variety of ways. For some of these client devices (e.g., smart phones, cellular phones, wearable devices, etc.), they may move with the users at certain times, or they may not always access the wireless network in the current scene; other client devices among these client devices (such as smart audio devices, webcams and other smart home devices) may be fixed in some areas in the home/office scene most of the time, and some of them need to keep the connection with the wireless network (e.g., webcam, smart air conditioner, etc.) in order to maintain the normal operation of these client devices or enable users to control and manage these devices anytime and anywhere. For example, when the user leaves the home/office, the smart phone will also leave and be no longer connected to the wireless network in the home/office. With the user leaving, some client devices (e.g., smart audio devices) may not have to connect to the wireless network, but the network cameras may still need to keep connected to the wireless network, so that the user may use the camera to monitor the situation of the corresponding location at any time. Note that the present disclosure does not specifically limit the type of the client device 120.

In the network environment 100 as in FIG. 1, a plurality of network devices are used to provide wireless access, so that the coverage area of the wireless network is wider, the capacity is larger and the transmission reliability is higher. In the prior art, if the plurality of network devices are always kept in the "on" state, especially their wireless access function, they will consume high amounts of power. Therefore, in view of such problems, in the embodiments of the present disclosure, a network device is used to determine the connection status of some predetermined client devices, and when it is determined that these predetermined client devices are not connected to the wireless network for a predetermined period of time, the wireless access function on one or more unnecessary network devices will be turned off, with only the wireless access function on necessary network devices being kept, so that the on/off of the wireless access function of network devices can be dynamically adjusted according to the situation of client devices, conducing to the reduction of power consumption.

Figure 2:
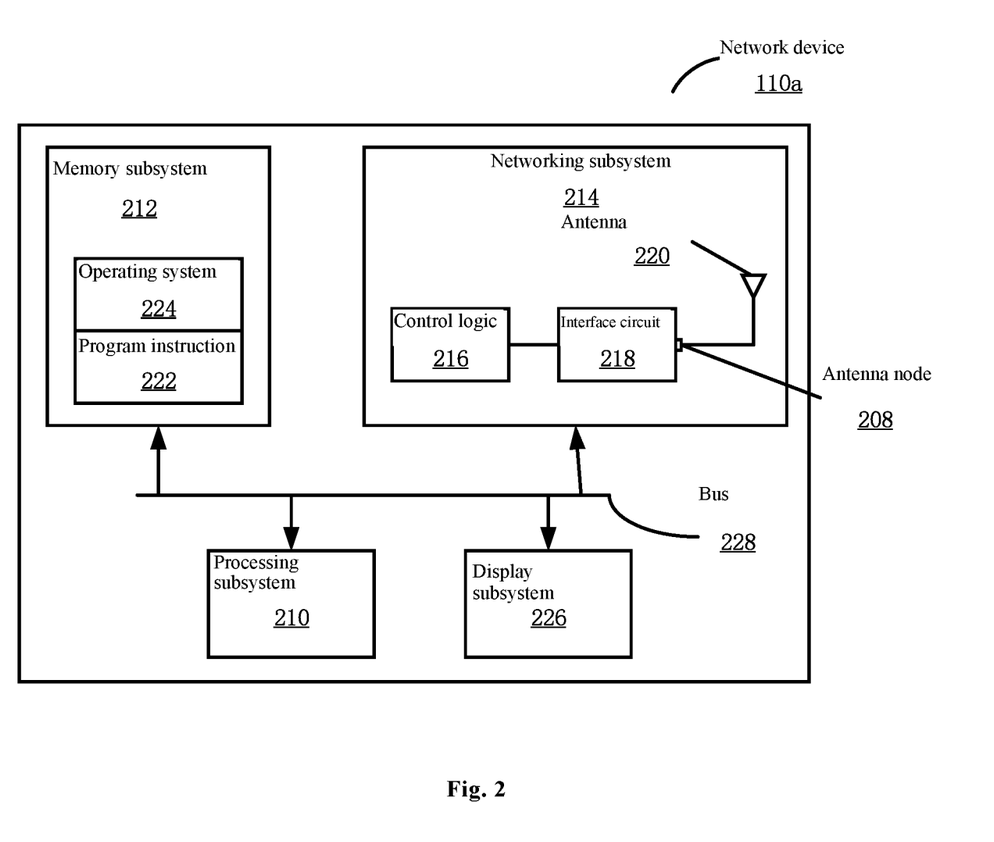
FIG. 2 is a schematic diagram showing a first network device according to an embodiment of the present disclosure.

Now, with reference to FIG. 2, we will describe an embodiment of a network device (referred to herein as a first network device, e.g., the network device 110*a* shown in FIG. 1), which can perform at least some operations according to the embodiments of the present disclosure in communication technology. The electronic device 110*a* may comprise a processing subsystem 210, a memory subsystem 212, and a networking subsystem 214.

The processing subsystem 210 comprises one or more devices configured to perform computing operations. The processing subsystem 210 provides various functions of the first network device 110*a*. In some embodiments, the processing subsystem 210 is configured to perform operations for saving power consumption in a wireless network. For example, the processing subsystem 210 may comprise one or more microprocessors, ASICs, microcontrollers, programmable logic devices, graphic processing units (GPU), and/or one or more digital signal processors (DSP). The processing subsystem 210 may execute various program instructions stored in the memory subsystem 212 to perform corresponding operations, for example, to execute various program instructions to realize the methods shown in FIG. 3, FIG. 4A and FIG. 4B.

The memory subsystem 212 comprises one or more devices for storing data and/or instructions used for the processing subsystem 210 and the networking subsystem 214. For example, the memory subsystem 212 may comprise a dynamic random access memory (DRAM), a static random access memory (SRAM), and/or other types of memory (sometimes collectively or individually referred to as "computer-readable storage medium"). In some embodiments, the instructions used in the memory subsystem 212 of the processing subsystem 210 comprise: one or more program modules or instruction sets (for example, a program instruction 222 or an operating system 224), which can be executed by the processing subsystem 210. It should be noted that one or more computer programs may constitute a computer program mechanism. In addition, an instruction in the various modules of the memory subsystem 212 may be implemented by the following: advanced programming languages, object-oriented programming languages and/or assembly or machine languages. Moreover, the programming language may be compiled or interpreted, e.g., as configurable or configured (used interchangeably in this discussion), for executing by the processing subsystem 210 to realize the functions of the present disclosure.

In addition, the memory subsystem 212 may comprise mechanism for controlling access to memory. In some embodiments, the memory subsystem 212 comprises a memory hierarchy, and the memory hierarchy comprises one or more caches coupled to the memory in the first network device 110*a*. In some of these embodiments, one or more the caches are located in the processing subsystem 210.

In some embodiments, the memory subsystem 212 is coupled to one or more high-capacity mass storage devices (not shown). For example, the memory subsystem 212 may be coupled to a magnetic or optical driver, a solid state driver, or another type of mass storage device. In these embodiments, the first network device 110*a* may use the memory subsystem 212 as a fast-access storage of frequently used data, whereas the mass storage device is used for storing infrequently used data.

The networking subsystem 214 comprises one or more devices configured to be coupled to a wired and/or wireless network and to communicate over the wired and/or wireless network (i.e., to perform network operations), including: control logic 216, an interface circuit 218, and one or more antennas 220 (or antenna elements). (Although FIG. 2 comprises one or more antennas 220, in some embodiments, the first network device 110*a* comprises one or more nodes that can be coupled to one or more antennas 220, such as node 208. Therefore, the first network device 110*a* may or may not comprise one or more antennas 220.) For example, the networking subsystem 214 may comprise a Bluetooth networking system, a cellular networking system (for example, 3G/4G/5G networks, such as UMTS and LTE), a USB networking system, a networking system based on standards described in IEEE 802.11 (for example, Wi-Fi networking system), Ethernet networking system, and/or another networking system.

In the first network device 110*a*, the processing subsystem 210, memory subsystem 212 and networking subsystem 214 are coupled together by bus 228. Bus 228 may comprise electro, optic and/or electro-optic connections where subsystems can be used to communicate commands and data, and so on. Although only one bus 228 is shown for clarity, different embodiments may comprise different numbers or configurations of electrical, optical, and/or electro-optical connections in the subsystems.

In some embodiments, the first network device 110*a* comprises a display subsystem 226 for showing information on a display device, which may comprise a display driver and a display, such liquid crystal display, multi-touch screen, and the like.

The first network device 110*a* may be (or may be comprised in) any electronic device with at least one network interface For example, the first network device 110*a* may be (or may be comprised in): a desktop computer, a laptop computer, a sub-notebook/netbook, a server, a computer, a mainframe computer, a cloud-based computer, a tablet computer, a smart phone, a cellular phone, a smart watch, a wearable device, a consumer electronic device, a portable computing device, an access point, a transceiver, a controller, a radio node, a router, a switch, a communication device, a test device, and/or other electronic devices.

Although specific components are used to describe the first network device 110a, in alternative embodiments, different components and/or subsystems may exist in the first network device 110a. For example, the first network device 110a may comprise one or more additional processing subsystems, memory subsystems, networking subsystems, and/or display subsystems. Besides, one or more subsystems may not exist in the first network device 110a. Moreover, in some embodiments, the electronic device 110a may comprise one or more additional subsystems not shown in FIG. 2. In addition, although separate subsystems are shown in FIG. 2, in some embodiments, some or all of the given subsystems or components may be integrated into one or more the other subsystems or components in the electronic device 110a. For example, in some embodiments, the program instruction 222 is comprised in the operating system 224, and/or the control logic 216 is comprised in the interface circuit 218.

Figure 3:
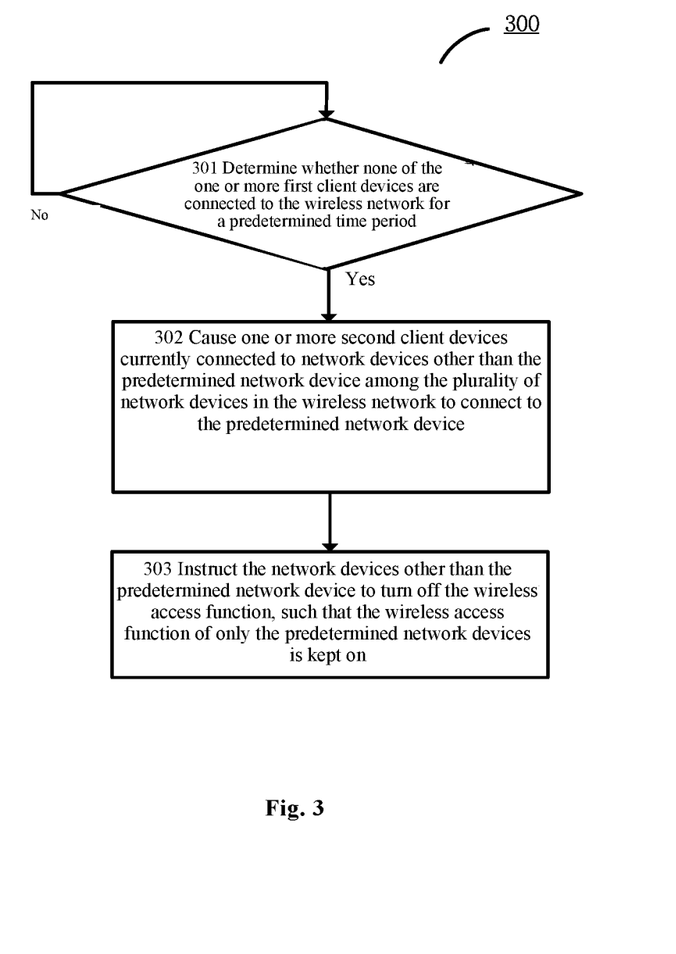
FIG. 3 is a schematic diagram of an exemplary method for a wireless network according to an embodiment of the present disclosure.

FIG. 3 is a schematic diagram illustrating an exemplary method 300 for a wireless network according to an embodiment of the present disclosure. Combined with the network environment shown in FIG. 1, the wireless network to which the method 300 is applicable may comprise a plurality of network devices 110 with a wireless access function, the plurality of network devices including the first network device 110a, and the method 300 may be executed by the first network device 110a.

The method 300 may comprise, in operation 301, determining whether none of one or more first client devices are connected to the wireless network for a predetermined time period. If yes, continue to execute operation 302; otherwise, return to operation 301 and continue to determine a connection state of the one or more first client devices.

The one or more first client devices may be, for example, mobile devices carried by the user, and may be preset by the user. For example, it is preset by the user through the configuration page or the graphical user interface of the application of the wireless network. The first client device can be set as a mobile device such as the user's smart phone, cellular phone, etc., which may indicate whether the user has left the current scenario to some extent. When the user has left, some client devices may not have to access the wireless network, so the wireless network can be switched to a state of lowering energy consumption.

The operations of the method 300 will be further illustrated by taking client devices 120a and 120b in FIG. 1 as the first client devices as an example.

The connection states of the client devices 120a and 120b can be determined by various ways. For example, the first network device 110a may periodically poll the network devices 110b and 110c, and determine the connection states of the client devices 120a and 120b according to the feedback of the network devices. In another example, the first network device 110a may periodically receive reports from the network devices 110b and 110c to determine the connection states of the client devices 120a and 120b.

The predetermined time described in operation 301 may be ten minutes, one hour, or very short, for example, close to 0 min (i.e., the moment when the first client device was just disconnected). The predetermined time can also be set by the user, for example, through a configuration page or a graphical user interface of the application of the wireless network.

With continued reference to FIG. 3, the method 300 may further comprise, in operation 302, performing an operation to cause one or more second client devices currently connected to network devices other than a predetermined network device among the plurality of network devices 110 in the wireless network to connect to the predetermined network device.

The predetermined network device may be one or more network devices whose wireless access functions are always kept on even if other network devices' wireless access functions are turned off. The predetermined network device may be preset by the user. For example, it can be preset by the user through the configuration page or the graphical user interface of the application of the wireless network. The predetermined network device can be preset by the user in consideration of the distribution of the network devices and/or the distribution of the client devices that need network connections at all times. For example, the user can select one or more of the plurality of the network devices that cover all the client devices that need to be always online as the predetermined network device(s). For example, in a home scenario, the predetermined network device can be set as one or more of the APs that cover all the client devices that need to be always online, such as a webcam, a smart refrigerator, and a smart air conditioner. Note that this disclosure does not put a limit on the number of the predetermined network devices. Also note that, the first network device (for example, a primary AP) may function as a controller of the wireless network and have the information of which network device is set as the predetermined network device that is always on. Nevertheless, other APs can also have knowledge of that information through communicating with the first network device, which is not limited by the present disclosure.

The one or more second client devices can be steered to connect to the predetermined network device in various ways. For example, the one or more second client devices are steered to connect to the predetermined network device by signaling based on wireless network protocol or by using blacklists of network devices. Now, we take FIG. 1 as an example to illustrate the operation in a case where the predetermined network device comprises the first network device 110a and in a case where the predetermined network device does not comprise the first network device 110a, respectively.

Take FIG. 1 as an example, when the predetermined network device comprises the first network device 110a, assuming that the predetermined network device is preset to be the first network device 110a, then client device 120c is a second client device in the wireless network that is not connected to the predetermined network device. The steering operation may be that the first network device 110a notifies the network devices 110b and 110c, so that the network devices 110b and 110c notify the client device 120c to connect to the predetermined network device through signaling based on a wireless network protocol (e.g., IEEE 802.11v). The steering operation may also be that the first network device 110a notifies the network devices 110b and 110c, so that the network devices 110b and 110c temporarily add the client device 120c to their respective blacklists, causing the client device 120c to connect to the predetermined network device.

Still take FIG. 1 as an example, when the predetermined network device does not comprise the first network device 110*a*, assuming that the predetermined network device is preset to be the network device 110*c*, then the client device 120*d* is a second client device that is not connected to the predetermined network device in the wireless network. The steering operation may be that the first network device 110*a* notifies the client device 120*d* to connect to the network device 110*c* through signaling based on a wireless network protocol (e.g., IEEE 802.11v). The steering operation may also be that the first network device 110*a* notifies the network device 110*b*, so that both the first network device 110*a* and the network device 110*b* temporarily add the client device 120*d* to their respective backlists, thus causing the client device 120*d* to connect to the network device 110*c*.

With continued reference to FIG. 3, the method 300 may further comprise, in operation 303, instructing the network devices other than the predetermined network device to turn off the wireless access function such that the wireless access function of only the predetermined network device is kept on.

For example, if the predetermined network device is the first network device 110*a*, the first network device 110*a* may notify the network devices 110*b* and 110*c* to turn off the wireless access function, such that the wireless access function of only the first network device 110*a* is kept on. If the predetermined network device does not comprise the first network device 110*a*, assuming that the predetermined network device is preset to be the network device 110*c*, then the first network device 110*a* can instructing itself and the network device 110*b*, to cause both the first network device 110*a* and the network device 110*b* to turn off the wireless access function, such that the wireless access function of only the network device 110*c* is kept on.

According to the embodiments of the present disclosure, the on/off of the wireless access function on the network devices can be dynamically adjusted according to the changing of the client devices (especially the client devices carried by the user), so that the wireless access function of only the necessary network devices is kept on, thus facilitating the reduction of power consumption.

Figure 4A:
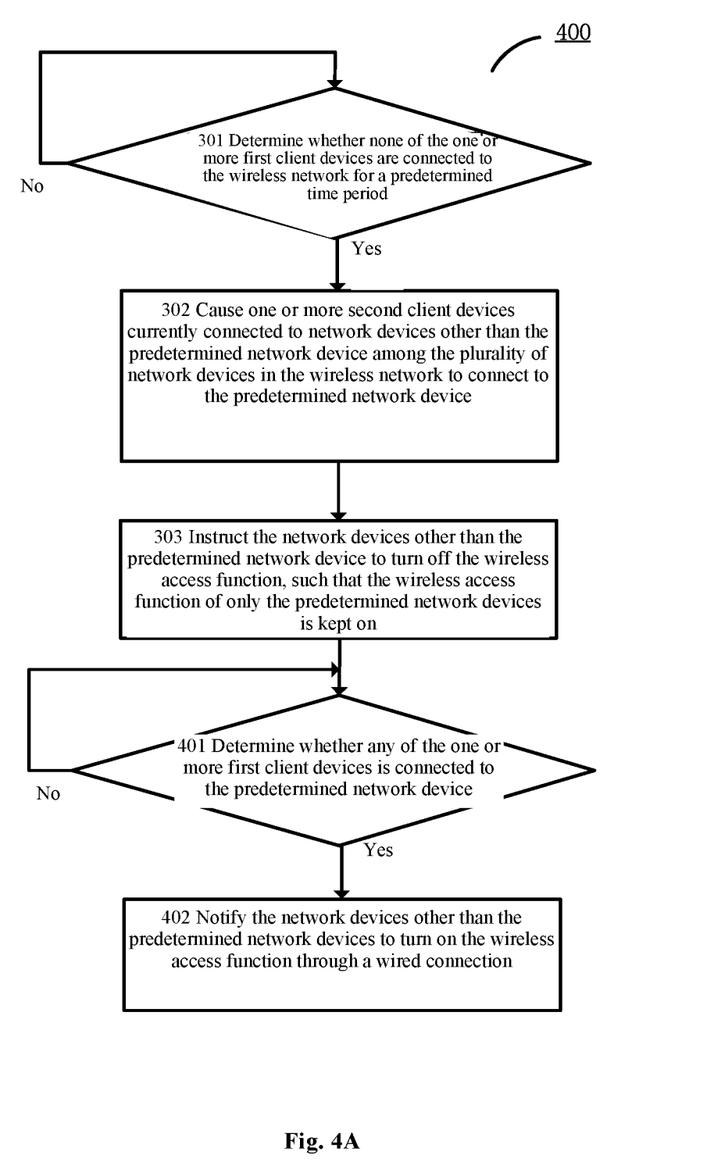
FIGS. 4A and 4B are schematic diagrams of another exemplary method for a wireless network according to an embodiment of the present disclosure.
Figure 4B:
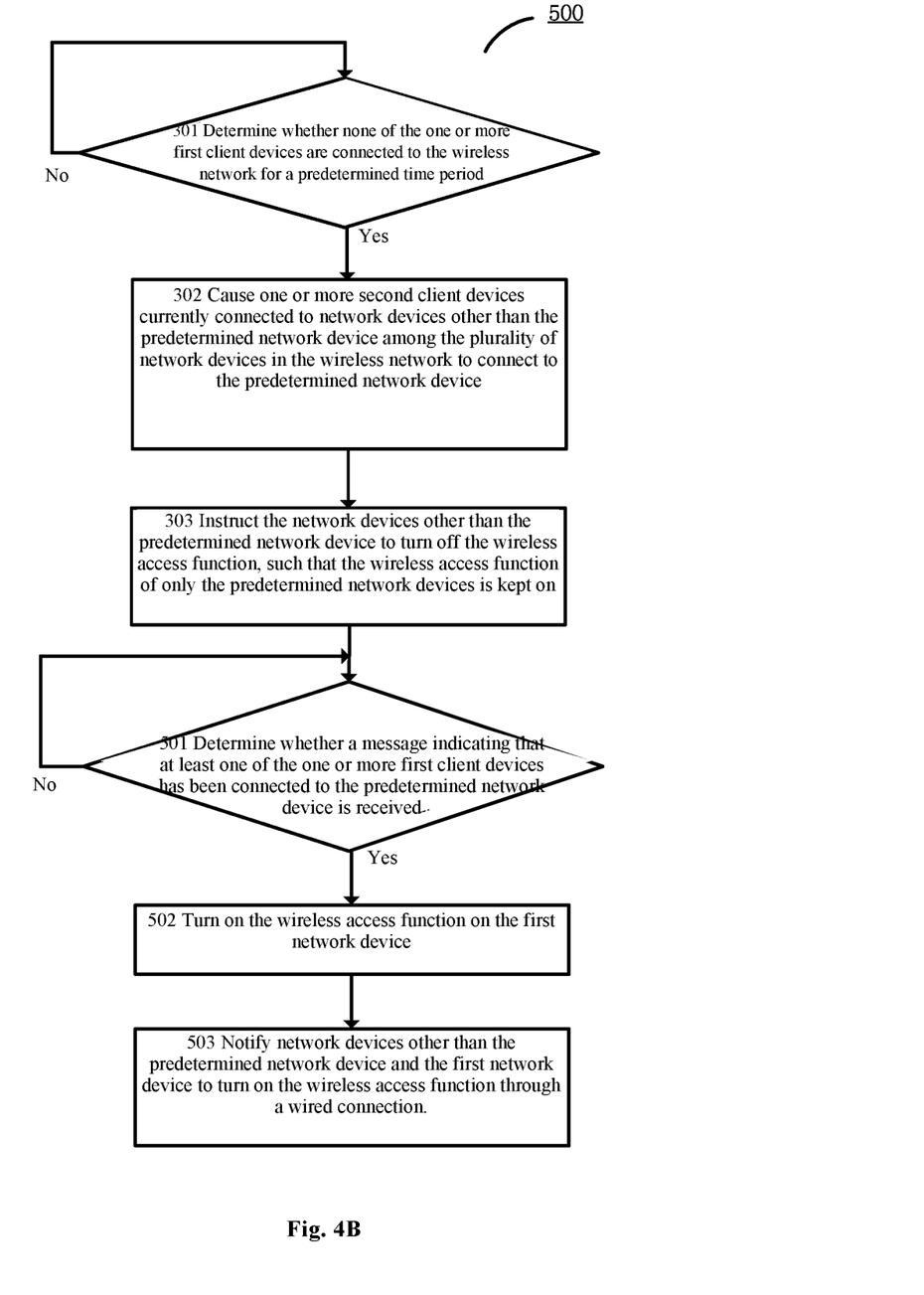

Now, exemplary methods 400 and 500 for wireless networks according to embodiments of the present disclosure will be described with reference to FIGS. 4A-4B. In the methods 400 and 500, at least one of the one or more first client devices that was not connected to the wireless network before is now connected to the wireless network, which may indicates, for example, that the user returns home/office, so that the wireless network can be switched from a state of saving energy to a state of normal operation. FIG. 4A shows the method 400 in the case where the predetermined network device that is always kept on comprises the first network device 110*a*, and FIG. 4B shows the method 500 in the case where the predetermined network device that is always kept on does not comprise the first network device 110*a*. Note that the methods 400 and 500 here can be executed by the first network device 110*a* shown in FIG. 1, the client device can be the client device 120 shown in FIG. 1, and the first network device 110*a* in the methods 400 and 500 is connected with other network devices 110*b* and 110*c* by wire.

The operations 301-303 in FIGS. 4A-4B are the same as the corresponding operations in FIG. 3, and will not be described again here.

Referring to FIG. 4A, in the case where the predetermined network device comprises the first network device 110*a*, the method 400 further comprises determining whether any of the one or more first client devices is connected to the predetermined network device 110*a* in operation 401. If yes, proceed to operation 402. If not, return to operation 401 and continue to determine whether any of the one or more first client device is connected to the predetermined network device 110*a*. In the case where the first client device is connected to the first network device 110*a*, the first network device 110*a* can determine the connection of the first client device by its own. On the other hand, in the case where there are more than one predetermined network device and the first client device is connected to another one of the predetermined network devices than the first network device 110*a*, the other predetermined network device may notify the first network device 110*a* of the connection of the first client device.

With continued reference to FIG. 4A, the method 400 further comprises, in operation 402, notifying network devices other than the predetermined network device to turn on the wireless access function through a wired connection. Take FIG. 1 as an example, assuming that the client device 120*b* is connected to the first network device 110*a* in operation 401, the first network device 110*a* will notify the network devices 110*b* and 110*c* to turn on the wireless access function through a wired connection.

Referring to FIG. 4B, in the case where the predetermined network device does not comprise the first network device 110*a*, assuming that the predetermined network device is preset to be the network device 110*c*, the method 500 further comprises, in operation 501, determining whether a message indicating that at least one of the one or more first client devices (e.g., the client device 120*b*) has been connected to the network device 110*c* is received from the network device 110*c* through a wired connection. If yes, proceed to operation 502. If not, return to operation 501 and continue to determine whether the corresponding message is received.

With continued reference to FIG. 4B, the method 500 further comprises, in operation 502, turning on the wireless access function on the first network device 110*a*.

With continued reference to FIG. 4B, the method 500 further comprises, in operation 503, notifying, by the first network device 110*a*, the network devices 110*b* to turn on the wireless access function through a wired connection.

By the exemplary methods shown in FIG. 4A and FIG. 4B, the on/off of the wireless access function on the network devices can be dynamically adjusted according to the changing of the client device (especially the client devices carried by the user), so that when the client devices leave the current network environment with the user, the wireless access function of only the necessary network devices is kept on, and when the client devices return to the current network environment with the user, the network device in the wireless network enters the normal working state, thus meeting the requirements of the client devices.

Although Wi-Fi and/or Ethernet communication protocols are used in the above discussion as illustrative examples, in other embodiments, various communication protocols may be used, and more generally, communication technologies may be used. Therefore, communication technologies can be used in various network interfaces. In addition, although some operations in the aforementioned embodiments are implemented by hardware or software, in general, the operations in the aforementioned embodiments may be implemented in various configurations and frameworks. Therefore, some or all of the operations in the aforementioned embodiments may be executed by hardware, software, or both. For example, at least some operations in the communication technology can be implemented using the program instruction 222, the operating system 224 (e.g., a driver for the interface circuit 218), or firmware in the interface circuit 218. Alternatively or in addition, at least some operations in the communication technology may be implemented at physical layer, such as hardware in the interface circuit 218.

The present disclosure can be implemented as any combination of devices, systems, integrated circuits, and computer programs on non-transient computer-readable media. One or more processors can be implemented as an integrated circuit (IC), an application specific integrated circuit (ASIC) or a large-scale integrated circuit (LSI), a system LSI, or a super LSI or super LSI component that performs part or all of the functions described in this disclosure.

The present disclosure comprises the use of software, applications, computer programs, or algorithms. Software, application programs, computer programs or algorithms can be stored on a non-transient computer readable medium, so that a computer with one or more processors can execute the above steps and the steps described in the drawings. For example, one or more memories store software or algorithms by executable instructions, and one or more processors can associate the execution of a set of instructions of the software or algorithms to provide monitoring in any number of wireless networks according to the embodiments described in this disclosure.

Software and computer programs (also called programs, software applications, applications, components, or codes) comprise machine instructions for programmable processors, and can be realized in high-level procedural languages, object-oriented programming languages, functional programming languages, logic programming languages, or assembly languages or machine languages. The term "computer-readable medium" refers to any computer program product, device or device used to provide machine instructions or data to the programmable data processor, such as magnetic disks, optical disks, solid-state storage devices, memories, and programmable logic devices (PLD), including computer-readable media that receive machine instructions as computer-readable signals.

For example, the computer-readable medium may comprise dynamic random access memory (DRAM), random access memory (RAM), read only memory (ROM), electrically erasable read only memory (EEPROM), compact disk only read memory (CD-ROM) or other optical disk storage devices, magnetic disk storage devices or other magnetic storage devices, or any other media that can be used to carry or store the required computer-readable program codes in the form of instructions or data structures and accessible by a computer or general or special purpose processor. As used herein, magnetic disks or disks comprise compact discs (CDs), laser disks, optical disks, digital versatile discs (DVDs), floppy disks, and blue-ray disks, where magnetic disks usually copy data magnetically, and disks use laser to optically copy data. Combinations of the above also fall into the scope of computer-readable media.

In one or more embodiments, the use of the words "able", "can", "operable as" or "configured as" refers to some devices, logics, hardware and/or components designed to be used in a specified manner. The subject matter of the present disclosure is provided as an example of the apparatus, system, method, and program for performing the features described in the present disclosure. However, in addition to the above-mentioned features, other features or modifications can be expected. It is expected that any newly emerging technology that may replace any of the above-mentioned implementation technologies can be used to complete the implementation of the components and functions of the present disclosure.

In addition, the above description provides examples without limiting the scope, applicability, or configuration set forth in the claims. Without departing from the spirit and scope of the present disclosure, changes may be made to the function and arrangement of the discussed elements. Various embodiments may omit, substitute, or add various processes or components as appropriate. For example, features described in some embodiments may be combined in other embodiments.

Similarly, although operations are depicted in a specific order in the drawings, this should not be understood as requiring such operations to be performed in the specific order shown or in a sequential order, or requiring the performance of all illustrated operations to achieve the desired result. In some cases, multi-tasking and parallel processing can be advantageous.

The invention claimed is:

1. A first network device being a cloud-based computer, the first network device comprising:
   a memory having instructions stored thereon;
   a processor, configured to execute the instructions stored on the memory to cause the first network device to perform the following operations:
   determining a connection state of one or more first client devices of a wireless network; and
   based on the connection state:
   causing one or more second client devices currently connected to one or more network devices other than a predetermined network device among a plurality of network devices in the wireless network to connect to the predetermined network device; and
   instructing the network devices other than the predetermined network device to turn off a wireless access function of the network devices other than the predetermined network device such that only a wireless access function of the predetermined network device is kept on.

2. The first network device according to claim 1, wherein the first network device is connected with other network devices among the plurality of network devices by wire, the processor is further configured to execute instructions stored on the memory to cause the first network device to perform the following operations:
   determining whether any of the one or more first client devices is connected to the predetermined network device; and
   in response to the determination that at least one of the one or more first client device is connected to the predetermined network device, instructing the network devices other than the predetermined network device to turn on the wireless access function.

3. The first network device according to claim 2, wherein in a case where the predetermined network device comprises the first network device, the processor is further configured to execute instructions stored on the memory to cause the first network device to perform the following operations:
   in response to the determination that the at least one of the one or more first client devices is connected to the predetermined network device, notifying the network devices other than the predetermined network device to turn on the wireless access function through a wired connection.

4. The first network device according to claim 2, wherein in a case where the predetermined network device does not comprise the first network device, the processor is further configured to execute instructions stored on the memory to cause the first network device to perform the following operations:

receiving a message from the predetermined network device through a wired connection, wherein the message indicates that the at least one of the one or more first client devices has been connected to the predetermined network device;

turning on the wireless access function on the first network device; and notifying network devices other than the predetermined network device and the first network device to turn on the wireless access function through a wired connection.

5. The first network device according to claim 1, wherein the processor is further configured to execute instructions stored on the memory to cause the first network device to perform the following operations:

periodically polling network devices other than the first network device among the plurality of network devices to determine the connection state of the one or more first client devices; or periodically receiving reports from the network devices other than the first network device among the plurality of network devices to determine the connection state of the one or more first client devices.

6. The first network device according to claim 1, wherein the processor is further configured to execute instructions stored on the memory to cause the first network device to:

cause the one or more second client devices to connect to the predetermined network device through signaling based on wireless network protocol; or cause the one or more second client devices to connect to the predetermined network device by temporarily adding the one or more second client devices to blacklists of the network devices other than the predetermined network device.

7. The first network device according to claim 1, wherein the one or more first client devices and the predetermined network device are set by a user through a configuration page or a graphical user interface of an application of the wireless network.

8. A method of a first network device being a cloud-based computer, the method comprising:

determining a connection state of one or more first client devices of a wireless network; and based on the connection state:
causing one or more second client devices currently connected to one or more network devices other than the predetermined network device among a plurality of network devices in the wireless network to connect to the predetermined network device; and instructing the network devices other than the predetermined network device to turn off a wireless access function of the network devices other than the predetermined network device such that the only a wireless access function of the predetermined network device is kept on.

9. The method according to claim 8, wherein the first network device is connected with other network devices among the plurality network devices by wire, and the method further comprising:

determining whether any of the one or more first client devices is connected to the predetermined network device; and in response to the determination that at least one of the one or more first client devices is connected to the predetermined network device, instructing the network devices other than the predetermined network device to turn on the wireless access function.

10. The method according to claim 9, wherein in a case where the predetermined network device comprises the first network device, the step of in response to the determination that the at least one of the one or more first client devices is connected to the predetermined network device, instructing the network devices other than the predetermined network device to turn on the wireless access function further comprising: in response to the determination that the at least one of the one or more first client devices is connected to the predetermined network device, notifying the network devices other than the predetermined network device to turn on the wireless access function through a wired connection.

11. The method according to claim 9, wherein in a case where the predetermined network device does not comprise the first network device, the step of in response to the determination that the at least one of the one or more first client devices is connected to the predetermined network device, instructing the network devices other than the predetermined network device to turn on the wireless access function further comprising:

receiving a message from the predetermined network device through a wired connection, wherein the message indicates that the at least one of the one or more first client devices has been connected to the predetermined network device;

turning on the wireless access function on the first network device; and notifying network devices other than the predetermined network device and the first network device to turn on the wireless access function through a wired connection.

12. The method according to claim 8, wherein the step of causing the one or more second client devices to connect to the predetermined network device further comprises:

causing the one or more second client devices to connect to the predetermined network device through signaling based on wireless network protocol; or causing the one or more second client devices to connect to the predetermined network device by temporarily adding the one or more second client devices to blacklists of the network devices other than the predetermined network device.

13. The method according to claim 8, wherein the one or more first client devices and the predetermined network device are set by a user through a configuration page or a graphical user interface of an application of the wireless network.

14. A non-transient computer-readable medium of a first network device being a cloud-based computer, the non-transient computer- readable medium having instructions stored thereon, that when executed by a processor of the first network device, cause the first network device to perform the following operations:

determining a connection state of one or more first client devices of a wireless network; and based on the connection state:
causing one or more second client devices currently connected to one or more network devices other than the predetermined network device among a plurality of network devices in the wireless network to connect to the predetermined network device; and instructing the network devices other than the predetermined network device to turn off a wireless access function of the network devices other than the predetermined network device such that only a wireless access function of the predetermined network device is kept on.

15. The non-transient computer-readable medium according to claim 14, wherein the first network device is connected with other network devices among the plurality of network devices by wire, the non-transient computer-readable medium further comprising instructions that, when executed by the processor of the first network device, cause the first network device to perform the following operations:
- determining whether any of the one or more first client devices is connected to the predetermined network device; and
- in response to the determination that at least one of the one or more first client devices is connected to the predetermined network device, instructing the network devices other than the predetermined network device to turn on the wireless access function.

16. The non-transient computer-readable medium according to claim 15, wherein in a case where the predetermined network device comprises the first network device, the non-transient computer-readable medium further comprising instructions that, when executed by the processor of the first network device, cause the first network device to perform the following operations: in response to the determination that the at least one of the one or more first client devices is connected to the predetermined network device, notifying the network devices other than the predetermined network device to turn on the wireless access function through a wired connection.

17. The non-transient computer-readable medium according to claim 15, wherein in a case where the predetermined network device does not comprise the first network device, the non-transient computer-readable medium further comprising instructions that, when executed by the processor of the first network device, cause the first network device to perform the following operations:
- receiving a message from the predetermined network device through a wired connection, wherein the message indicates that the at least one of the one or more first client devices has been connected to the predetermined network device;
- turning on the wireless access function on the first network device; and
- notifying network devices other than the predetermined network device and the first network device to turn on the wireless access function through a wired connection.

18. The non-transient computer-readable medium of claim 14, further comprising instructions that, when executed by the processor of the first network device, cause the first network device to:
- cause the one or more second client devices to connect to the predetermined network device through signaling based on wireless network protocol; or
- cause the one or more second client devices to connect to the predetermined network device by temporarily adding the one or more second client devices to blacklists of the network devices other than the predetermined network device.

19. The non-transient computer readable medium according to claim 14, wherein the one or more first client devices and the predetermined network device are set by a user through a configuration page or a graphical user interface of an application of the wireless network.

20. The non-transient computer readable medium according to claim 14, wherein the determining whether any of the one or more first client devices is connected to the predetermined network device further comprises:
- periodically polling network devices other than the first network device among the plurality of network devices to determine the connection state of the one or more first client devices; or
- periodically receiving reports from the network devices other than the first network device among the plurality of network devices to determine the connection state of the one or more first client devices.

* * * * *